United States Patent [19]
Scheibenreif et al.

[11] Patent Number: 5,460,517
[45] Date of Patent: Oct. 24, 1995

[54] SHAFT KILN FOR BURNING A LUMPY, MINERAL CHARGE

[75] Inventors: Karl Scheibenreif, Kloten; Jiri Pacak, Langnau am Albis, both of Switzerland

[73] Assignee: Maerz-Ofenbau AG, Zurich, Switzerland

[21] Appl. No.: 22,125

[22] Filed: Feb. 25, 1993

[30] Foreign Application Priority Data

Mar. 7, 1992 [CH] Switzerland .................. 00712/92

[51] Int. Cl.$^6$ ..................................... F27D 1/08
[52] U.S. Cl. .................. 432/95; 432/98; 432/99
[58] Field of Search .................. 432/99, 98, 97, 432/96, 95, 101

[56] References Cited

U.S. PATENT DOCUMENTS 4,094,629 6/1978 Greenwalt .................... 432/98
4,747,773 5/1988 Predescu et al. .............. 432/99
4,797,092 1/1989 Pieper ......................... 432/95
4,881,869 11/1989 Henneken et al. ............. 432/98

*Primary Examiner*—Raymond A. Nelli
*Attorney, Agent, or Firm*—Ladas & Parry

[57] ABSTRACT

The kiln operating according to the parallel-flow-regenerative process has two shafts (2, 3), which at the transition from the burning zone (14) to the cooling zone (15) have a widening forming an inner step (38) at which the combustion gases are transferred to the adjacent shaft (2, 3). This widened shaft area continues at least approximately cylindrically up to the bottom opening (35) of the shafts (2, 3) closed by a discharge device (34). This design of the shaft areas makes it possible, preferably together with an improved fuel distribution and charging device and in the case of satisfactory product quality, to burn limestone having particles in the size range 10 to 30 mm, which could hitherto not be burned in shaft kilns.

1 Claim, 2 Drawing Sheets

SHAFT KILN FOR BURNING A LUMPY, MINERAL CHARGE

BACKGROUND OF THE INVENTION

The invention relates to a shaft kiln for burning a mineral charge, particularly small-sized limestone, in a parallel-flow-regenerative process, with at least two circular cylindrical shafts, each of which has a preheating zone, a burning zone and a cooling zone and which are interconnected in the transition area between the burning zone and the cooling zone by a connecting passage for combustion gases flowing in periodically alternating directions, the shafts being surrounded by a common passage connected to the shaft areas, so that at the transition to the adjacent shaft, said passage forms the connecting passage.

A shaft kiln of this type corresponds to the known MAERZ construction. The circular cross-section of his shafts is necessary for an adequately uniform heat distribution over the shaft cross-section, if the kiln is to be suitable for larger throughput capacities, as cannot be achieved in the case of rectangular shaft cross-sections. There is also a good heat distribution of the joint, surrounding passage, in that it permits a uniform drawing off of combustion gases from the burning zone of one shaft and a uniform supply thereof to the adjacent shaft. However, it make it necessary to increase the diameter of the shaft area in the upper region of the cooling zone compared with the diameter of the part of the shaft area of the cooling zone located above it. Thus, there is an increased conical taper in the direction of the shaft bottom opening, which is of a conventional nature for shaft outlets, silo outlets, etc.

For a uniform heat distribution and for preventing a clogging or blocking up in the vicinity of the passages, it is also necessary to downwardly limit the lump size of the material to be burnt, so that to obtain a satisfactory quality of the burned product it is recommended that the lump size distribution be in the range 30 to 150 mm. Material with a small particle size of less than 30 mm must be separated and processed in some other way, e.g. in a more complicated rotary kiln operating with a lower thermal efficiency. DE-A-1 252 850 admittedly already proposes a shaft kiln suitable for burning a material with a minimum particle size of 10 mm, but it is then necessary to accept constructional disadvantages, which prevented the practical realization of such a kiln.

SUMMARY OF THE INVENTION

The problem of the invention is to find a kiln of the aforementioned type which, unlike in the case of known shaft kilns, is also suitable without any decrease in efficiency and significant quality deterioration with respect to the burnt product, for processing a charge with a much smaller lump size, e.g. in the range 10 to 30 mm, so that there is no need for processing in rotary kilns.

According to the invention this problem is solved in that the shaft interior in the vicinity of the cooling zone and following onto the surrounding passage extends downwards with an at least approximately constant cross-section to a bottom shaft opening closed by a discharge device.

Although the solution according to the invention requires a larger size of the lower furnace area and the discharge device, this extra expenditure is soon made good by the relatively large throughput capacity of such shaft kilns and the relatively low energy consumption thereof.

As a result of the only small, step-free slope or lack of slope of the shaft wall in the cooling zone up to the outlet edge of the bottom opening, it is ensured that granular material does not grow on the shaft wall and constrict the combustion gas flow path. The considerable kiln efficiency drop, which can lead to shaft kiln failure occurring in the case of shaft kilns of the aforementioned, known type as a result of the clogging of the flow path is prevented in this way.

As a result of the larger particle size distribution range in the kiln, it is recommended that finer and coarser particulate material be supplied to the kiln in radially different areas. For this purpose it is particularly appropriate to use e.g. a charging device as known from CH-A-678 847.

For a better distribution of the heat supply and therefore for a uniform product quality, it is recommended that a narrower arrangement and a larger number of lances are provided for the supply of a liquid or gaseous fuel.

BRIEF DESCRIPTION OF THE DRAWINGS

The invention is described in greater detail hereinafter relative to a non-limitative embodiment and the attached drawings, wherein show.

DETAILED DESCRIPTION OF THE PREFERRED EMBODIMENT

Figure 1:
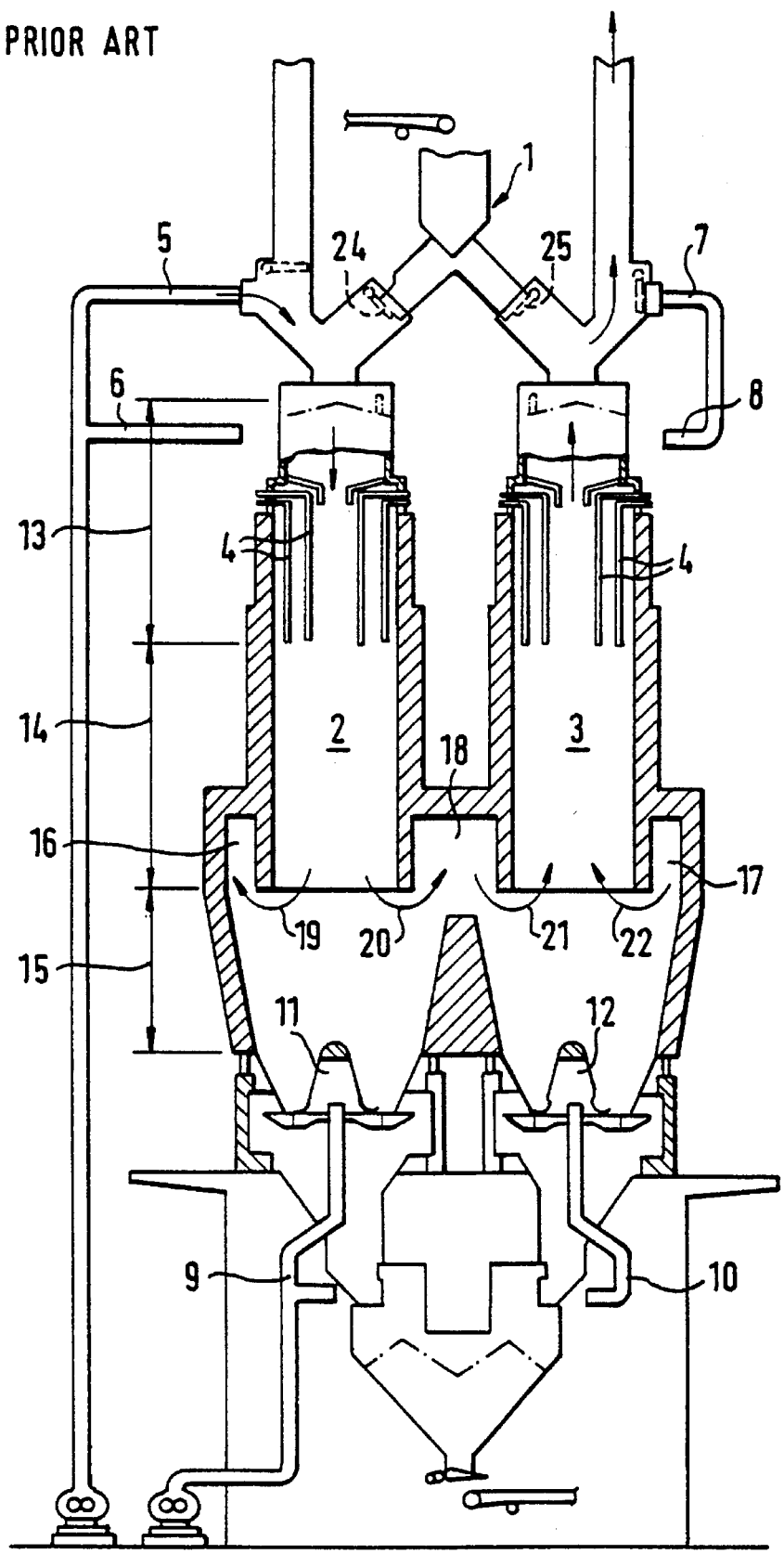
FIG. 1 A diagrammatic sectional representation of a known kiln.

FIG. 1 shows a parallel-flow-regenerative lime kiln in accordance with the Applicant's brochure. Large numbers of such kilns are manufactured and are known to the Expert as MAERZ kilns.

Figure 2:
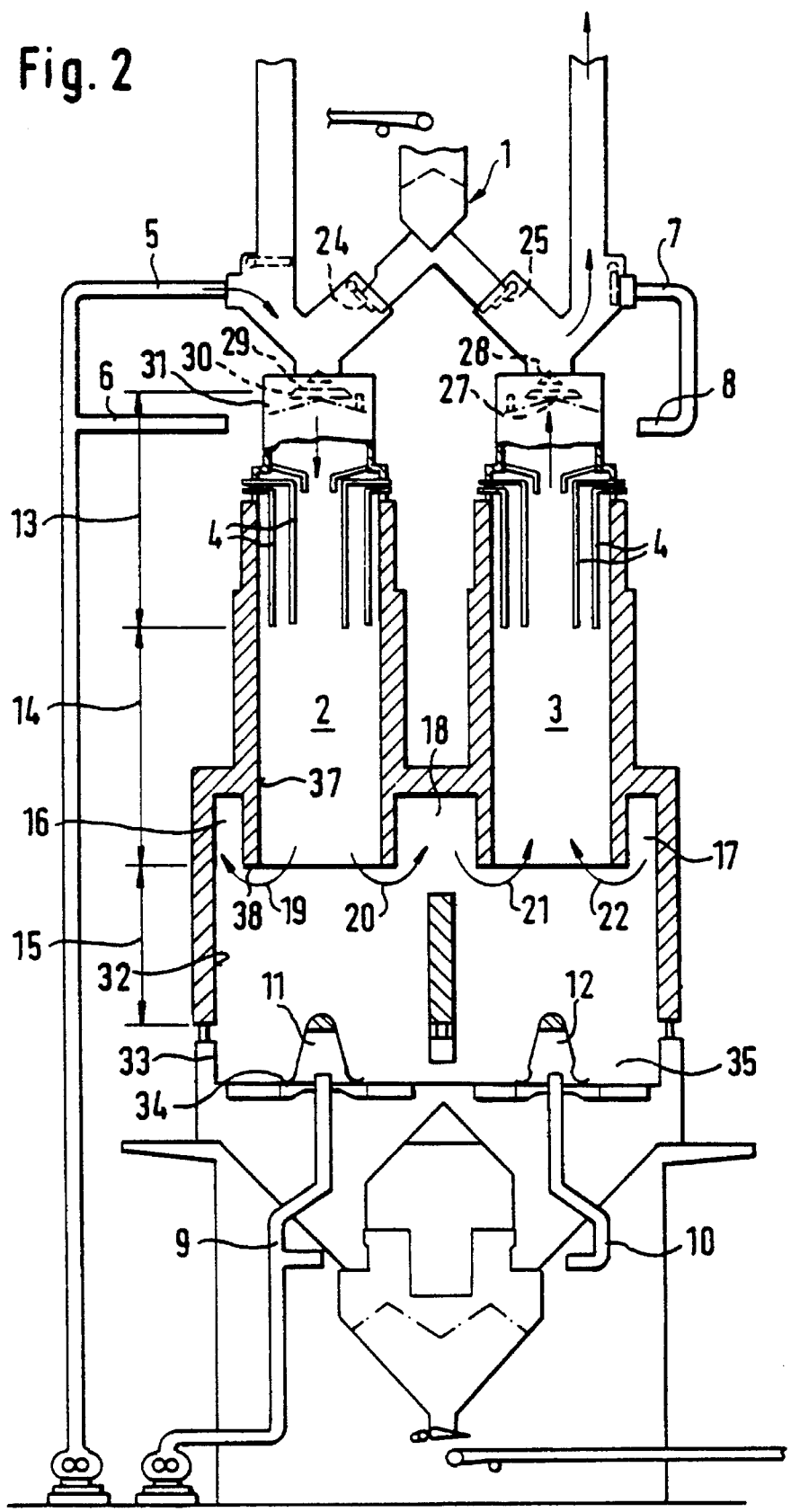
FIG. 2 A simplified, part sectional representation of a kiln according to the invention.

As also in the case of the kiln according to the invention and FIG. 2, the charge alternately supplied to the shafts 2, 3 by means of the charging device 2 is simultaneously burned in both shafts 2, 3. In intervals of 12 to 15 minutes only one shaft is heated, in that the fuel supply by means of the lances 4 and the feeding in of combustion air by means of the pipes 5 to 8 take place in a corresponding periodic manner to only a single shaft 2 or 3. Cooling air is continuously supplied from below to the shafts 2, 3 by means of the lines 9, 10 and a central distributing cone 11, 12. Therefore for the charge the shafts have an upper preheating zone 13, a central burning zone 14 and a lower cooling zone 15.

The combustion gases flow out of the combustion zone 14 into an annular passage surrounding the particular shaft 2, 3 and a connection 18 between the two annular passages 16, 17 permits an overflow to the annular passage 17, 16 of the adjacent shaft 3, 2. The arrows 19–22 indicate the flow direction, during the heating of the left-hand shaft 2 and during the preheating in the right-hand shaft 3 of the charge by means of the combustion gases flowing upwards therein.

The charging of the kiln shafts 2, 3 preferably also takes place in alternating manner during the switching over of the heating, in that the corresponding flap 24 or 25 of the charging device 1 is opened.

For an advantageous distribution between coarser and finer charge, in the embodiment of a kiln according to the invention shown in FIG. 2 below the charging device 1 and within the shaft 2, 3 is provided a split distributing cone 27, which fills a significant part of the shaft cross-section. The upper or radial central part 28 of the distributing cone 27 can be pivoted away to the side. In the pivoted away position of the adjustable cone part 28 the always centrally charged charge passes through the central opening 29 of the lower cone part 30 into the central region of the shaft 2, 3, whilst in the case of a central position of the upper cone part 28 over the central opening 29, the charge slides radially outwards over the two cone parts 28, 30 and consequently the gap 31 between the distributing cone 27 and the shaft wall into the peripheral shaft area. There is subsequently an improved thorough mixing during the slow sinking of the charge through the burning zone of the shaft 2, 3.

The diameter of the shafts 2, 3 in the burning zone is e.g. 3.5 m.

As can be seen from a comparison of FIGS. 1 and 2, unlike in the case of the known kiln, the kiln according to the invention has shafts 2, 3, whose inner wall face 32 in the vicinity of the cooling zone 15 is vertical and therefore circular cylindrical to the edge 33 of the bottom opening 35 closed by the discharge table 34. AT the start of the cooling zone 15 the wall face 32, which is cylindrical or inclined inwards by less than 4°, is outwardly displaced with respect to the inner face 37 of the shaft 2, 3 in the vicinity of the burning zone 14 to a larger diameter, so that there is an inner step 38. The latter is flowed round in hairpin-like manner at very high temperatures by the combustion gases on their journey into the annular passage 16 and in the direction indicated by the arrows 19, 20.

In said region of the flow path of the combustion gases or in the region of the flow into the annular passage 16, a clogging of the shaft cross-section, particularly caused by the finer-grained charge, would be particularly disadvantageous, because in this region there is in any case a constriction of the combustion gas flow path. The clogging or blocking up of the necessary flow cross-sections in known shaft kilns can lead to a drop to zero of the kiln efficiency or to the complete failure of the kiln. In the case of a shaft kiln according to the invention, as a result of the novel design of the interior of the shafts in the vicinity of the cooling zone 15 a clogging of the flow cross-section and an efficiency decrease, even when using a charge with a particle size of 10 to 30 mm, is reliably avoided. This also makes it possible to use the advantageous overall shaft kiln design for the processing of stone material, which has hitherto had to be disposed of on waste heaps or burnt in a very expensive manner in rotary kilns.

What is claimed is:

1. A shaft kiln for burning a mineral charge, particularly small-sized limestone in a parallel-flow-regenerative process with at least two circular cylindrical shafts (2,3), each of which has a pre-heating zone (13), a burning zone (14) and a cooling zone (15) and which are interconnected in the transition area between the burning zone (14) and the cooling zone (15) by a connecting passage (18) for combustion gases flowing in periodically alternating direction, the shaft (2,3) being surrounded by a common passage (16,17) connected to the shafts, so that at the transition of adjacent shafts (2,3) the common passage forms the interconnecting passage (18), a charging device (1) being provided having a distributing device (27,31) for the separate charging of a finer and coarser charge material to radially different shaft areas, wherein the shaft interior in the vicinity of the cooling zone (15) and following onto the surrounding passage (16,17) extends downward with an at least approximately constant cross-section to a bottom shaft opening (35) closed by a discharge device (34), the shaft interior in the vicinity of the cooling zone (15) extends in circular cylindrical manner to the bottom shaft opening (35), and, at the transition region from the burning zone (14) to the cooling zone (15), the shafts (2,3) are widened downwardly by means of a step to a cylindrical shaft.

* * * * *